April 9, 1963
P. S. DOKUCHITZ ETAL
3,085,183
ELECTRICAL CONDENSERS AND METHOD OF MAKING SAME
Filed Jan. 30, 1959
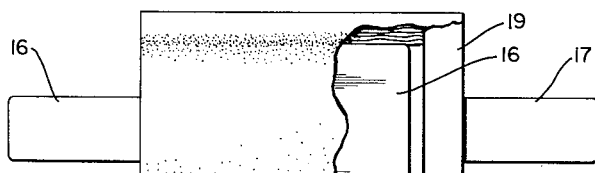
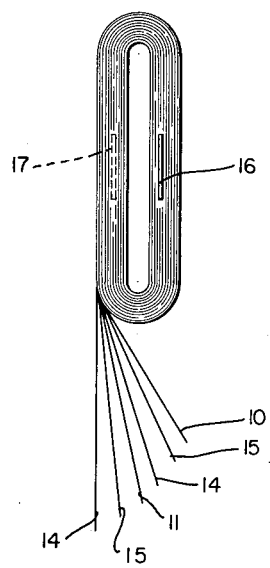
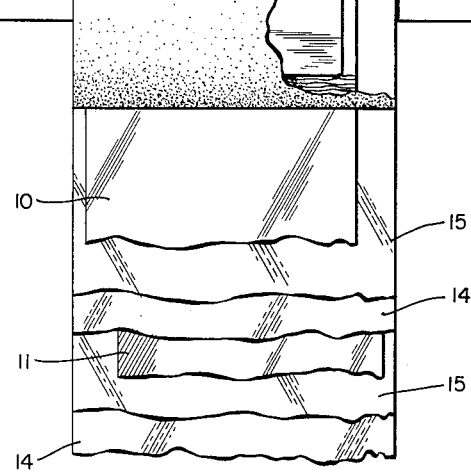
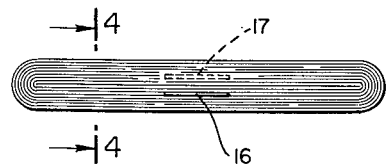
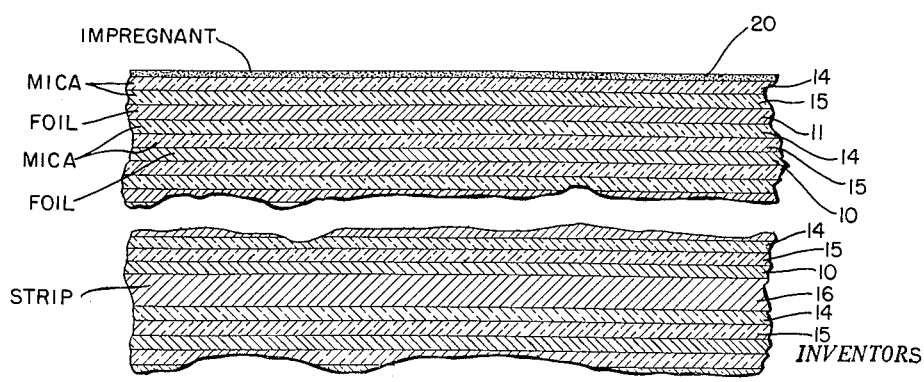
INVENTORS
PETER SERGI DOKUCHITZ
BY LOUIS HARRIS SEGALL
Bauer and Seymour
ATTORNEYS United States Patent Office 3,085,183
Patented Apr. 9, 1963

3,085,183
ELECTRICAL CONDENSERS AND METHOD OF MAKING SAME
Peter S. Dokuchitz, Unadilla, and Louis H. Segall, Sidney, N.Y., assignors to The Bendix Corporation, a corporation of Delaware
Filed Jan. 30, 1959, Ser. No. 790,269
15 Claims. (Cl. 317—258)

This invention relates to electrical apparatus and more particularly to electrical condensers or capacitors, and to methods for fabricating the same.

One of the objects of the present invention is to provide an electrical condenser of novel construction which has better physical and electrical characteristics and properties than condensers heretofore made of the same or generally similar materials.

Another object of the present invention is to provide a novel condenser which successfully operates for long periods without deterioration at temperatures on the order of 400° F.

Still a further object is the provision of a novel condenser which successfully withstands hard usage in either ground or airborne applications without substantial alteration of its electrical characteristics.

Another object is to provide a novel, high quality condenser having the above properties which may be made at relatively low cost.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a side view of a partially wound condenser;

FIG. 2 is an end view illustrating a condenser or capacitor in the process of being wound;

FIG. 3 is an end view of one form of finished condenser embodying and made in accordance with the present invention; and FIG. 4 is a fragmentary view on a greatly enlarged scale of a section of the condenser of FIG. 3, the setcion being taken generally along line 4—4 in FIG. 3.

The condenser of the present invention represents an improvement over that disclosed in Ruscito applications Serial No. 248,698, filed September 28, 1951 (now Patent No. 2,951,002) and Serial No. 741,709, filed June 4, 1958 (now Patent No. 3,026,457). The condenser of the present invention, which is made in generally the same manner as that described and claimed in the above Ruscito appliactions, is particularly adapted for applications wherein during use it may be subjected to a wide range of temperatures ranging, for example, from −67° F. to +400° F. Temperatures of such range may be encountered on equipment employed in the Arctic wherein the condenser is closely associated with a rocket, ram jet or jet engine. It is important that such condensers suffer no ill effects or marked changes in capacity as their temperature is changed within the operational range and even though they are subjected to marked mechanical shocks as by reason of acceleration, a landing of an aircraft, and the like.

The so-called condenser or capacitor discharge type of ignition system for combustion engines has come into quite common use in recent years, particularly on rocket, jet, or gas turbine engines for aircraft and missiles where a high energy spark is required. In these systems a condenser is repeatedly charged and discharged to create the necessary ignition sparks having high energy. Accordingly, the condenser is an essential part of such ignition systems, and failure thereof is likely to result in failure of the engine and consequent loss of life or severe injury to personnel and destruction of valuable aircraft or other property. It is therefore an important object of this invention to improve this essential element of present-day ignition systems by making the same more efficient and more durable, particularly as regards its resistance to deterioration under conditions imposing wide variations in operating temperature.

The embodiment of the invention illustrated in the drawings and hereafter described in detail, by way of example only, is a condenser having a capacity of .14 μf. and adapted for use as a storage condenser in an engine ignition system. The conductive plates of the condenser are constituted by two strips 10 and 11 of thin metal foil. Aluminum foil having a thickness of about .00025″ has been found satisfactory in one commercial embodiment. These strips are preferably of equal width and are spirally wound directly over each other but separated and insulated from each other by two layers 14 and 15 of suitable insulating material. In the preferred embodiment of the present invention layers 14 and 15 are made of reconstituted mica. Layers 14 and 15 are made from reprocessed or recombined mica, formed of natural mica broken up into minute flakes and recombined into a continuous mat or sheet. Reconstituted mica sheets made by the Samica Company and sold under the trademark "Samica" may be used for layers 14 and 15 in accordance with the invention. Each insulating sheet 14 and 15 is, in the described embodiment, about .0013″ thick and sufficiently wide to extend about .062″ beyond each side edge of the foil sheets 10 and 11. The foil sheets are preferably longitudinally offset about a half inch so that the adjacent ends thereof will be staggered in a like amount. The foil sheets are, of course, insulated from each other throughout the condenser by insulating layers 14 and 15, and a few of the outermost turns of the condenser are preferably free of foil.

Terminals 16 and 17 preferably extend from laterally opposed halves and opposed ends of the condenser. Said terminals may consist of thin strips of metal, preferably silver, one in good electrical contact with one foil plate 10 and the other in good electrical contact with foil plate 11. The terminal strips may be loosely inserted in the position shown when the condenser has been approximately half wound. When the condenser has been impregnated and compressed in the novel manner hereinafter described the terminals will make excellent contact with the foil layers and be well secured in position without the use of solder or the like. The wound layers of foil and insulating sheets are impregnated and retained in a substantially flat or out-of-round shape by a special insulating compound which is applied in a manner which is to be hereinafter described. The layers of foil and insulating sheets are tightly compressed to a flat shape (FIG. 3) with the compound filling the pores and interstices in the interposed reconstituted mica layers, thereby improving the insulating properties thereof. The reconstituted mica layers are not stressed by the action of the impregnating compound and the strength and density thereof are rendered substantially greater by compression than they were before fabrication of the condenser.

The condenser described above is preferably fabricated by the following method. The foil layers 10 and 11 and the reconstituted mica layers 14 and 15 are tightly wound on a flat, highly polished mandrel 19, as illustrated in FIG. 1. To facilitate removal of the mandrel after the winding of the condenser the edges of the mandrel may be very slightly tapered such as to the extent of about .001″ per inch of length. When winding the two layers of foil and two interposed layers of insulating strip so that there is a layer of insulation between the foil strips on all points, care should be taken to avoid any wrinkles. When about half the length of the paper and foil strips have been wound, the terminal strips 16 and 17 are inserted in the positions illustrated. These leads or terminals should be smooth and free of any particles which might rupture the insulating layers 14 and 15 or foil strips under compression. The winding should be carried out in a room free from dust or similar particles of foreign matter in the air. When the desired number of turns has been wound, the foil layers are cut with the adjacent ends thereof staggered about a half inch or more and at least the outside reconstituted mica layer is wound completely to cover the outside foil and secured with a minimum adhesive compound to prevent unwinding of the turns of the condenser during further fabrication.

The condenser is now slipped off the mandrel so that when the sides of the condenser are lightly pressed toward each other to close the opening left by the mandrel, the layers of foil and reconstituted mica will assume a loosely wound condition. Preferably a number of such wound condensers are positioned in a stacking fixture with smooth spacing plates coated, for example, with polytetraflorine resin between successive condensers, each separate plate being large enough to protrude beyond the condensers on all four sides. The plates should be clean and free from nicks, mars or other contamination and made of a metal to which the impregnating compound will not adhere. The thus loosely stacked or supported condensers are dried in a convection over or the like at about 350° F. for at least 8 hours. Upon removal of the condensers from the oven they are immediately placed in an impregnating tank (which is then empty of impregnant) and baked at 0.5 inch of mercury absolute pressure maximum until the condensers reach a temperature of 280° F.±10° F. The minimum elapsed time of such latter baking under vacuum should be 8 hours, and the vacuum should be uninterrupted. After the above described second baking in a vacuum, the condensers, still maintained in the specified vacuum, are cooled below 100° F. The condensers are now ready for impregnation.

The impregnating compound which is preferably employed in accordance with the present invention is essentially triallyl cyanurate resin in which there is incorporated a small but effective amount of a catalyst which speeds up the polymerization. In the preferred embodiment of the invention the triallyl cyanurate resin is one having the following characteristics:

*Monomeric Form*

(1) Color, APHA (above melting point) _____ 125 max. (Straw).
(2) Melting point_____ 25° C. min.
(3) Halogens, as Cl_____ 0.8% max.
(4) Viscosity at 30° C_____ 10-20 cps.
(5) Specific gravity at 30° C_____ 1.116-1.126.

*Polymeric Form*

(6) Power factor at 250° F_____ 1.5% max.
(7) Dielectric constant at 250° F__ 4-5.2.

Such resin is sold by the American Cyanamid Company. The catalyst employed in accordance with the invention is preferably benzoyl peroxide, the preferred impregnant consisting of the triallyl cyanurate resin and the catalyst, there being 0.50 parts by weight of such catalyst to 100 parts by weight of the triallyl cyanurate resin. The trially cyanurate resin is solventless.

After the catalyst has been mixed with the triallyl cyanurate, and while the condensers which have been baked as above described are maintained under vacuum, the impregnating tank is gradually filled with the above described catalyzed impregnating resin. During such impregnating step the pressure in the impregnating tank must not exceed one half inch of mercury absolute pressure throughout the intake of the impregnating compound, and the compound must be maintained at 80°–90° F. during the process. After the impregnating tank has been filled with the compound to a height sufficient completely to cover all the condensers, the tank is allowed to remain under the stated vacuum for 1 hour. The vacuum is then reduced slowly to room pressure, and the parts are allowed to soak for 60 minutes. The tank is then very slowly subjected to 50–60 p.s.i. air pressure, such pressure being maintained on the tank for 45 minutes. The pressure is then reduced slowly to atmospheric pressure following which the impregnating tank is evacuated to ¼″ of mercury absolute pressure maximum, such vacuum being held for 20 minutes.

The vacuum is now reduced slowly to room pressure, after which 50–60 p.s.i. air pressure is applied to the chamber, the chamber being held under such pressure for 20 minutes minimum. The pressure in the tank is now reduced slowly to room pressure. The impregnated condensers are now removed from the tank, are drained for 2 minutes and are installed in a pressing fixture.

The impregnated condensers, preferably stacked in multiple, are subjected to a spring pressure which is increased from 0 to 500 lbs. over a period of 2 minutes, the pressure being maintained at 500 lbs. for an additional 5 minutes at the end of the initial period. Immediately following such additional 5 minute period, the pressure on the stack of condensers is increased to 1250 pounds, and is held at such value for 5 minutes. The pressing fixture is now locked to maintain the pressure of 1250 pounds on the stack.

The entire locked pressing fixture and its contained stack of condensers is repeatedly dipped into a bath of cleaning agent, which may be, for example, methylene chloride. Such dipping is preferably carried out rapidly, as by dipping the mold in the cleaning agent 8 times within 10 seconds. Neither the mold nor the stacked condensers should be allowed to stand in the cleaning agent. Excess solvent is removed, after the last dipping, by allowing the pressing fixture and its contents to dry in the air; evaporation of the solvent from the fixture and its contents may be hastened by the use of air circulating means such as an electric fan. Still remaining cleaner should be wiped from the pressing fixture, and the fixture and its contents then transferred to a baking oven for curing the impregnating resin.

The baking is carried out in a temperature controlled oven initially heated to 200° F. in accordance with the following cycle:

(1) The fixture and its contents are first maintained at 200° F.±10° F. for 3 hours.
(2) The temperature of the oven is continuously increased at a constant rate of 20° F. per hour to 420° F.±10° F. Such period takes approximately 11 hours.
(3) The oven is maintained at 420° F.±10° F. for 2 hours.

During all of periods 1, 2, and 3 the pressure exerted upon the condensers by the pressing fixture should be maintained at a minimum of 1000 pounds.

Following baking period 3 the pressing fixture and its contents are removed from the oven and allowed to cool to room temperature. After this, the condensers are removed from the stacking and pressing fixture, care being taken not to injure the condensers as they are thus removed and separated.

Following such separation of the condensers and cleaning of the exposed ends of terminals 16, 17 as with a suitable solvent, the condensers are individually tested for capacity, power factor, breakdown voltage, and insulation resistance. The condensers as thus fabricated will normally have a thin layer of cured impregnant 20 on their outer surfaces, thus tending to waterproof them.

For best results, however, the condensers should be housed in a moisture-tight casing or coating both during storage and use.

There is thus provided a novelly constructed electrical condenser or capacitor in the form of a solid and dense mass which is entirely free of internal voids or air pockets and wherein the layers are free of detrimental internal stresses. Said condenser is capable of withstanding higher temperatures and higher voltages than heretofore known condensers of comparable size, weight, and capacity having the same temperature rating. In comparison to similar known structures, said condenser permits less electrical losses, possesses a better power factor and has less corona. The invention also comprehends a novel method for making condensers to endow them with the above advantages. Condensers made in accordance with said method are extremely reliable and will function efficiently and effectively for longer periods of time under severe operating conditions than known types of condensers adapted for the same purposes and uses. Said condensers are physically durable as well as electrically superior.

Although only a limited number of embodiments of or variations in the condenser and method comprehended by the invention have been illustrated in the drawings and described in the foregoing specification, it is to be expressly understood that the invention is not so limited. Thus, for example, the reconstituted mica insulating sheets may be replaced by sheets of other high temperature resistant sheet material having suitable properties, such as glass paper of which that sold as "Tissuglas" by American Machine and Foundry Company is typical. The catalyst employed may be dicumyl peroxide, or other suitable organic peroxide, and the amount of catalyst employed, per 100 parts by weight of triallyl cyanurate, that is, of benzoyl peroxide, dicumyl peroxide, or other suitable organic peroxide, may range from 0.1 to 2.0 parts of catalyst. The amount of catalyst employed depends generally upon the speed with which it is desired that polymerization of the resin shall proceed. Various other changes and modifications which do not depart from the spirit and scope of the invention will now be apparent to those skilled in the art.

What is claimed is:

1. A substantially flat, spirally wound condenser having the opposed halves of the innermost turn of insulation in engagement with each other, said condenser including a solid insulating composition impregnating the layers and holding the same in substantially flat compressed condition, the impregnating composition consisting essentially of cured triallyl cyanurate.

2. A condenser as defined in claim 1, wherein the triallyl cyanurate resin is solventless.

3. A condenser as defined in claim 2, wherein the insulation includes at least one layer of insulating sheet material consisting essentially of mica.

4. An electrical condenser comprising at least two layers of metal foil, at least two layers of sheet insulation, said layers being spirally wound with the metal foil separated by said insulating layers, and a solid insulating compound filling the spaces between said layers, opposed halves of the condenser as divided by a plane containing the winding axis thereof being compressed and pressed together to form a substantially flat condenser with the opposed halves of the innermost turn of sheet insulation in engagement with each other, the insulating compound consisting essentially of cured triallyl cyanurate.

5. A condenser as defined in claim 4, wherein the triallyl cyanurate resin is solventless.

6. A condenser as defined in claim 5, wherein the insulation consists essentially of mica.

7. The method of making an electrical condenser which includes winding two layers of sheet metal with at least one layer of sheet insulation therebetween, impregnating said condenser under vacuum with a flowable insulating compound composed essentially of triallyl cyanurate while the layers are loosely wound, subjecting the opposed sides only of said condenser to pressure between substantially flat surfaces which are movable toward each other by said pressure while the compound is flowable and without restriction other than the condenser itself, said pressure being sufficient fully to compress and flatten the condenser to expel excess compound and press adjacent layers into close engagement, and baking the condenser in order at least partially to cure the compound while maintaining the condenser under substantial pressure.

8. The method as defined in claim 7, comprising baking and curing the condenser under substantially the same pressure as the pressure employed to compress and flatten the condenser.

9. The method as defined in claim 8, wherein the baking to cure the impregnating compound is carried out in a cycle wherein the temperature is progressively increased throughout a substantial portion of the cycle.

10. The method as defined in claim 9, wherein the baking is carried out for an initial relatively short period at a temperature on the order of 200° F., the temperature is then progressively raised throughout a predominant portion of the remainder of the cycle to a temperature on the order of 420° F., and the temperature is thereafter held at substantially said higher temperature for an appreciable period.

11. An electrical condenser comprising a plurality of tightly stacked superimposed layers of sheet metal, at least one layer of insulating sheet material interposed between each successive pair of metal layers, means electrically connecting alternate metal layers together, and a solid insulating compound filling the spaces between said metal and insulating layers, the insulating compound consisting essentially of cured triallyl cyanurate resin.

12. An electrical condenser as defined in claim 11, wherein the insulating compound impregnates the insulating layers.

13. An electrical condenser as defined in claim 12, wherein the impregnating compound retains the layers in tightly stacked condition.

14. An electrical condenser comprising a plurality of tightly stacked superimposed layers of sheet metal, at least one layer of heat resistant insulating sheet material consisting essentially of mica interposed between each successive pair of metal layers, means electrically connecting alternate metal layers together, and a solid insulating compound filling the spaces between said metal and insulating layers, impregnating the insulating layers, and retaining the metal and insulating layers in said tightly stacked condition, the impregnating compound consisting essentially of cured solventless triallyl cyanurate resin.

15. An electrical condenser as defined in claim 11, wherein said sheet metal layers and the layers of insulating material comprise superposed webs spirally wound.

References Cited in the file of this patent

UNITED STATES PATENTS

| 2,634,315 | Allison | Apr. 7, 1953 |
| 2,665,400 | Walker | Jan. 5, 1954 |
| 2,793,334 | Robinson | May 21, 1957 |
| 2,883,308 | Yamada | Apr. 21, 1959 |
| 2,890,396 | Hutzler et al. | June 9, 1959 |
| 2,938,153 | Netherwood | May 24, 1960 |

FOREIGN PATENTS

| 596,311 | Great Britain | Jan. 1, 1948 |